Sept. 5, 1961 G. WILLIAMS ET AL 2,998,720
METAL SKIN SIMULANT
Filed Dec. 10, 1957 2 Sheets-Sheet 1

Glenn Williams
Hoyt C. Hottel
INVENTORS.

BY

L. I. Shrago

Sept. 5, 1961 G. WILLIAMS ET AL 2,998,720
METAL SKIN SIMULANT
Filed Dec. 10, 1957 2 Sheets—Sheet 2

Glenn Williams
Hoyt C. Hottel
INVENTORS.

BY

2,998,720
METAL SKIN SIMULANT
Glenn Williams, Lexington, and Hoyt C. Hottel, Winchester, Mass., assignors, by mesne assignments, to the United States of America as represented by the Secretary of the Navy
Filed Dec. 10, 1957, Ser. No. 701,943
7 Claims. (Cl. 73—15)

The present invention relates generally to apparatus for and methods of investigating unsteady heat transfer in relatively thin layers of solid materials and more particularly to a simulator for reproducing the temperature-time-depth conditions existing within organic materials that are exposed to relatively short bursts of high intensity thermal radiations.

In order to evaluate the effectiveness of clothing fabrics and materials as protective barriers against the high intensity radiant heat fluxes liberated by nuclear reactions and atomic explosions, it is necessary that the degree of damage suffered by the human skin and by the clothing after such an exposure be ascertained. Medical examination of live skin after exposure is common practice; but the use of test animals is associated with the disadvantages of high cost, particularly in field testing, and a high degree of variability of the subject.

An alternative approach for estimating the degree of damage inflicted on the skin is to measure the temperature history of the irradiated specimen. Comparison of the temperature history of bare skin with that of skin protected by clothing would then serve as an indication of the latter's value as a protective thermal barrier. Available evidence indicates that the degree of damage is a function of the combined effect of the temperature level to which the skin is raised and the time interval during which this temperature is maintained. However, the difficulty of procuring live test specimens and the fact that existing measuring techniques and instruments are incapable of giving accurate temperature readings at the shallow depths involved preclude any type of direct experimentation on the skin itself.

Although it is possible to solve by analytical methods the temperature-time-depth relationship for either opaque or diathermanous skin, providing the effects of chemical reaction in the skin are ignored, these methods cannot be readily extended to the solution of multilayer systems, that is, for example, skin protected by clothing fabrics and, thus, cannot be employed to assist in the evaluation of the protection such fabrics afford the skin.

It is accordingly a primary object of the present invention to provide a skin simulant which, when irradiated at high intensity under conditions either of exposure bare or of exposure through clothing of any description, will behave in a manner which corresponds to human skin insofar as temperature rises both in the clothing and in the skin are concerned.

Another object of the present invention and one of equal importance is to provide a simulant which effectively magnifies the thickness dimension of the skin and thereby permits relatively accurate temperature measurements to be made at shallow depths thereof.

Another object of the present invention is to provide apparatus for use in investigating the degree of thermal protection afforded by various types of clothing fabrics to the extremely high intensity radiant heat fluxes produced by atomic reactions and the like.

A still further object of the present invention is to provide a skin simulator for simplifying the problem of determining the degree and the nature of the damage suffered by organic materials when exposed to high temperature atmospheres.

A still further object of the present invention is to provide apparatus for use in the study of unsteady-state heat transfer conditions within thin conducting materials or layers.

Other objects and many of the attendant advantages of this invention will be readily appreciated as the same becomes better understood by reference to the following detailed description when considered in connection with the accompanying drawings wherein.

In order faithfully to duplicate the temperature behavior of the human skin, it is necessary that the simulant accept heat at a rate identical to the acceptance rate of the skin itself when the surfaces of the two are subjected to identical temperature-time histories or flux-density-time histories, either by direct radiation or by conduction through cloth or any combination of heat-flux mechanisms. If this condition obtains, then the cloth covering will behave identically over skin or its simulants. Conversely, if this heat-sink match is not made, the cloth response will be nontypical of its performance over the skin. For example, cloth over a massive block of copper would survive an irradiation which would char it if it overlay living skin.

Besides satisfying the above requirements as to identity of heat acceptance, it is desirable for temperature measurement purposes that the skin simulant possess a depth "stretch factor" so that corresponding temperatures occur at appreciably greater depths in the simulant than in the skin. It can be shown that a substance having a high thermal conductivity $k$ and a low volumetric heat capacity $c\rho$ compared with skin, but a value of the $k.c.\rho$ product equal to that of skin, will have the property of magnifying the depths at which these equivalent temperatures are obtained. Materials having this combination of characteristics, however, do not exist and, consequently, it is impossible to fabricate the skin simulant from a homogeneous substance.

Figure 1:
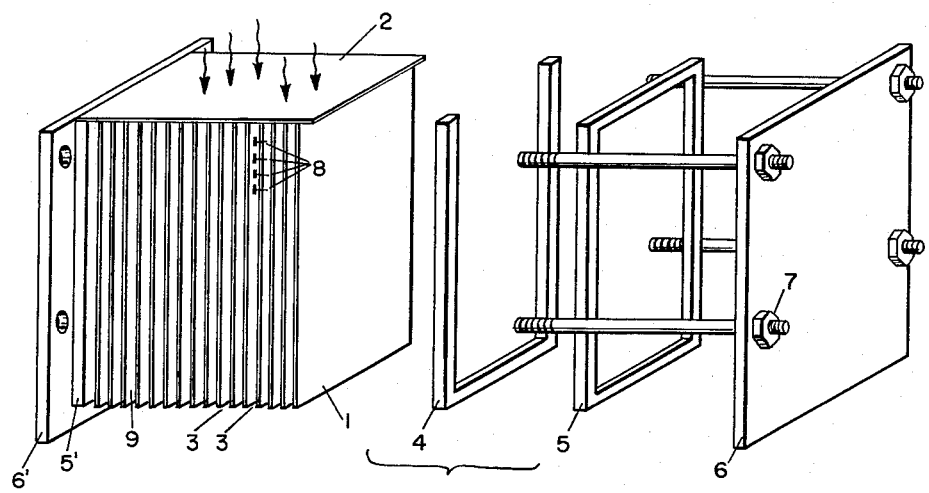
FIG. 1 is an exploded view of a heterogeneous skin simulant of the sandwich type in which the elements of high thermal conductivity are disposed parallel to the direction of heat flow.

Referring now to the drawings, there is disclosed in FIG. 1 a heterogeneous or sandwich type skin simulant according to one preferred embodiment of the present invention which consists of a multiplicity of parallelly disposed, highly heat-conducting sheets or fins 1 soldered or otherwise intimately secured to an extremely thin top conducting plate 2. These fins provide the desired high thermal conductivity mentioned above, while the air spaces 3 between them provide the complementary low volumetric heat capacitance. In order to maintain a predetermined calculated separation between the fins and to seal in the air, U-shaped spaces 4 of plastic composition are arranged to be inserted between adjacent fins. A pair of insulating plastic end spacers 5 and 5' and a companion pair of metallic closure plates 6 and 6', held in place on opposite sides of the fin assembly by tie bolts 7, complete the assembly.

To provide an indication of the temperatures at various distances from the top conducting sheet 2, which sheet acts as the energy-receiving surface, a plurality of temperature measuring devices, generally represented by reference character 8, are secured in spaced alignment along the center line of the central fin 9. Conventional thermocouples or temperature-sensitive lacquers can serve as the temperature-indicating means, depending upon whether it is desired continuously to monitor the temperature variations or simply to provide information concerning the maximum value reached. It will be appreciated that the thermocouple connections should be such that a minimum temperature disturbance is created at their locales.

From the rules governing the conduction of heat in semi-infinite solids, it can be shown that the stretch factor "$a$" of a composite assembly, as the one illustrated in FIG. 1, in the limiting case in which $(c\rho)L$ and the ratio of $$\frac{k_L}{k_H}$$

both approach zero, is equal to $$\sqrt{\frac{\left(\frac{k}{c\rho}\right)_H}{\left(\frac{k}{c\rho}\right)_S}}$$

where $c\rho$ is the volumetric heat capacity, $k$ the thermal conductivity, and subscripts H, L and S denote the material having the higher thermal conductivity, the material having the lower thermal conductivity and the skin.

Another important design factor is the fraction of the simulant volume occupied by the material of the higher thermal conductivity. This factor "$f$" is equal to $$\frac{L_H}{L_H + L_L}$$

where $L_H$ and $L_L$ stand for the thickness of the highly conducting sheets and the air space respectively. The design factor "$f$," which is likewise a measure of the over-all conductivity and heat capacity of a system consisting of a combination of high and low conductivity materials, can be expressed by the relationship $$f = \sqrt{\frac{(kc\rho)_S}{(kc\rho)_H}}$$

In constructing a simulant according to the above description and design formulas, it is preferable that fins 1 be made of electroformed thin copper sheets of high purity. Such metallic sheets give high stretch factors and simplify the construction of the thermocouples because they can serve as one of the components thereof. For example, the thermocouples can be formed by simply soldering fine constantan wires (0.0025 cm. diameter) to the central copper fin. Insulating lacquer spray or Saran film can then be employed to isolate the wires from the fins. In one embodiment of this invention, design factors "$a$" and "$f$" were 28.4 and 0.0338, the thickness ratio of copper to air was .035 and with copper sheets having a thickness of .006 cm. the air space was .172 cm.

Figures 2, 4:
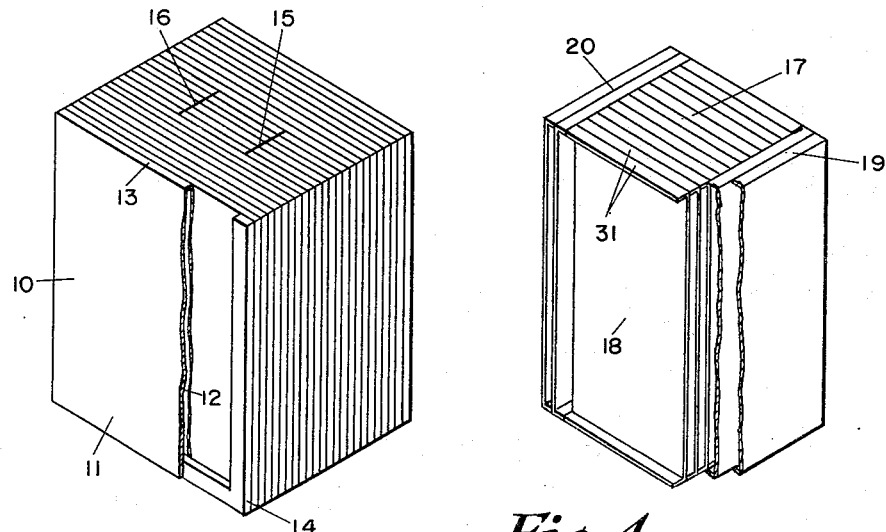
FIG. 2 illustrates a skin simulant of the folded fin type construction.
FIG. 4 illustrates a skin simulant of the soldered fin construction.

FIG. 2 illustrates a skin simulant of the folded fin construction wherein each of the individual fins 10 is fabricated in the form of a U-shaped channel member having spaced parallel sidewalls 11 and 12 and a top portion 13. In this embodiment the top surfaces of the folded fins serve as the radiation receiving surface and the U-shaped spaces 14 perform the same function as their counterparts in FIG. 1.

Figure 3:
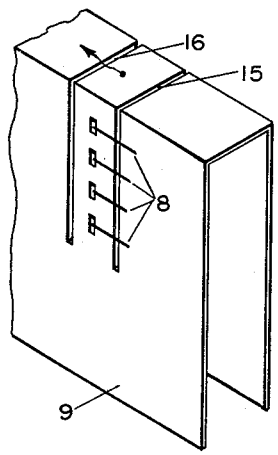
FIG. 3 illustrates the construction details of the central fin unit of FIG. 2.

To cut down the lateral heat flow to the "heat-sinks" created by the plastic spaces 14, slits 15 and 16 are cut in a group of the central fins. As shown in FIG. 3 these slits extend completely across the top surface of the fins and down the front and back walls an arbitrary amount. In order to increase the air space provided by these slits, one of the edges of the slit can be slightly bent out of the plane of the sidewalls. As a result of the above slits, each of the central fins is actually divided through most of its depth into three parts: a central section with all the thermocouples mounted on it, and two guard sections.

Figure 5:
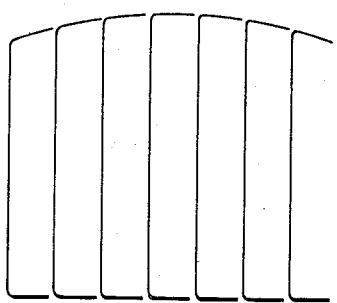
FIG. 5 shows a skin simulant wherein the radiation-receiving surface is curved.

In FIG. 4 there is depicted an alternative construction in which a main group of shallow channels 17 are assembled with their web portions 18 parallel. The top or radiation-receiving surface of the simulant is formed by the channel flanges 31 with the toe of each flange secured to the heel of the adjacent one. At the bottom the flanges are also connected toe-to-heel throughout their length to lend rigidity to the assembly. A first and second pair of guard channels 19 and 20 are placed perpendicular to the main group 17 to block the exposed air space and help to maintain more nearly linear isotherms in the central portion of the simulant. To facilitate the attachment of clothing fabrics to the radiating-receiving surface of the simulant the top flanges can be curved as shown in FIG. 5.

Figure 6:
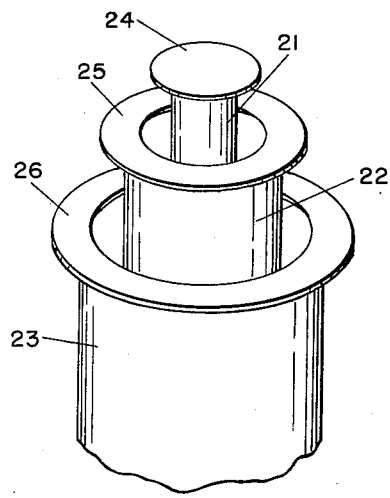
FIG. 6 illustrates a skin simulant of the concentric cylinder type construction showing the elements before final alignment of the heat-receiving surfaces in a common plane.
Figure 7:
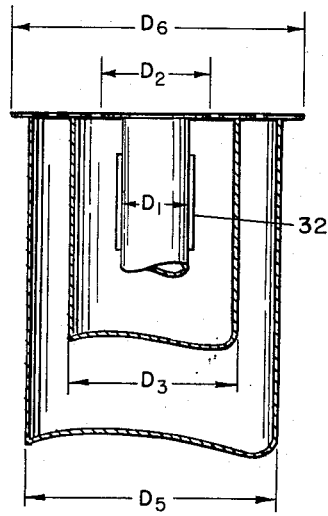
FIG. 7 is a cross-sectional elevation through the center of FIG. 6, after alignment of the elements.

FIG. 6 illustrates a concentric-cylinder type of simulant which is comprised of a central cylinder 21 and a pair of guard cylinders 22 and 23. Each of these cylinders is terminated at one of its ends by a disk member, with the outer diameter of the innermost disk 24 approximately equal the inner diameter of the intermediate disk 25, and the outer diameter of this disk, in turn, approximately equal to the inside diameter of the outer disk 26. As a consequence of this relationship, the individual cylinders telescope into each other when the unit is assembled and the surfaces of the three disks become coplanar, as more clearly shown by FIG. 7 which is a cross section taken through the axis of symmetry of the unit of FIG. 6. To keep the individual cylinders in proper alignment, a plurality of insulated bushings can be inserted in the other ends of the cylinders. Because the central cylinder 21 is readily removable for inspection, this type of simulant is most suitable for recording maximum heat penetration and a temperature sensitive lacquer 32 can be readily applied directly to its outer wall surface. This type simulant has also been found in practice to eliminate heat-loss errors due to radial heat flux to the sides of the simulant more successfully than the others. The air gaps in this type system must be placed at those radii where, by mathematical analysis, there is no radial temperature gradient; and the further condition must be met that the ratio of heat-receiving surface of each element to the cross-section of the tubular heat-flow path must be the same for all members of the assembly. This multiple constraint causes all dimensions of the device to be fixed by a choice of wall-thickness and radius of the first tube. In one embodiment of the tubular-type simulator, the following dimensions were used:

| | |
|---|---|
| Thickness of Cu sheet | $0.004_0''$ |
| $D_1$ (inner cylinder) | $0.174_2''$ |
| $D_2$ (inner disc) | $0.287_2''$ |
| $D_3$ (mid-cylinder) | $0.418_0''$ |
| $D_5$ (outer-cylinder) | $0.649_2''$ |
| $D_6$ (outer disc) | $0.766_6''$ |

$f = 0.0338$; $a = 28.4$; cylinder length $3\frac{1}{4}''$.

It will be appreciated, of course, that the principle of stretching, as hereinbefore discussed, is applicable to the design of simulants of other solids for the study of unsteady-state heat transfer, especially when temperature-time-depth data within a thin layer are desired. A simulant can also be used to evaluate the thermal properties of thin layers of materials by placing the simulant behind such a material and analyzing the temperature-time-depth data obtained under different irradiation exposure conditions. An example which may be of great importance would be that of the "skin" and substructure of ballistic missiles which would be subject to extremely high temperatures upon re-entering the earth's atmosphere. Structural members covered with a thin skin of Dural or a ceramic material would be analogous to the case of human skin covered by a fabric.

Obviously many modifications and variations of the present invention are possible in the light of the above teachings. It is therefore to be understood that within the scope of the appended claims the invention may be practiced otherwise than as specifically described.

What is claimed is:

1. A simulator for use in studying the temperature-time-depth conditions within a solid material that has been exposed to a burst of thermal energy comprising a metallic surface, a plurality of at least three parallelly disposed planar metallic members extending perpendicularly from one side of said surface, temperature insulating means for sealing off the air spaces between adjacent planar members and means for indicating the temperature on the surface of the central member at successively greater distances from said one side of said surface when the other side of said surface is exposed to a burst of thermal energy.

2. A heterogeneous simulator for use in the study of unsteady-state heat transfer conditions within solid materials comprising, in combination, a relatively thin metallic plate, a plurality of at least three parallelly spaced rectangular metallic fins extending perpendicularly from one side of said plate, means including the opposing surfaces of adjacent fins and portions of said plate for providing enclosed air chambers between adjacent fins and means for indicating the temperature existing at selected points along the length of a sheet located along the center line of said plate when the other side of said plate is subjected to bursts of thermal energy.

3. In a simulator of the type described in claim 2 means for insulating the outer surfaces of the end fins of said plurality of fins whereby radiation from these surfaces is minimized.

4. A heterogeneous simulator for studying unsteady-state heat transfer conditions within relatively thin materials comprising a thin metallic plate, a plurality of at least three parallelly spaced rectangular fins of metallic material secured perpendicularly to one side of said plate, U-shaped temperature insulating members positioned between opposing walls of adjacent fins with their ends contacting said one side of said plate and with their outer side and base surfaces coterminous with the side and base edges of said fins whereby a series of sealed air chambers are formed between adjacent pairs of fins, and means for indicating the temperature at a multiplicity of points spaced in vertical alignment along the wall of a fin positioned along the center line of said plate when the other side of said plate is exposed to a short burst of thermal energy.

5. A simulator for reproducing the temperature-time-depth conditions existing within a relatively thin layer of solid material that has been irradiated by a short burst of thermal energy comprising a plurality of at least three U-shaped channel members, said members being stacked in alignment with the outer surfaces of their base portions coplanar and their sidewalls parallel, U-shaped insulators inserted in each channel member and closing off the air space subtended by the opposing wall surfaces of each channel member, a pair of slots cut through the base portions of a central group of said channel members, said slots extending down the sidewalls an intermediate distance so as to subdivide said channels into a mid-portion and a pair of end portions, said slots serving as air gaps to attenuate the heat flow from said mid-portions to said end portions when the base portions of said channels are irradiated by thermal energy, and means for indicating the temperature at a plurality of points spaced in vertical alignment along a wall of the central channel of said plurality of channels.

6. A simulator for use in the study of unsteady-state heat transfer conditions within relatively thin solids comprising a group of at least three metallic channel members, the individual channels of said group being in contact toe-to-heel throughout their length with the top flanges thereof forming a coplanar thermal energy receiving surface and their web portions lying in parallel planes, a first and second pair of metallic channels having their individual members positioned in the same manner, means for joining the exposed toe edges of the top and bottom flanges of the end channel of each pair to the top and bottom side edges of the flanges of the individual channels of said group so that the web portions of said pairs of channels lie in planes perpendicular to those in which the web portions of said group are disposed, said pairs of channels blocking the air spaces between the webs of the channels of said group whereby more nearly linear isotherms are maintained in the central portion of the thermal energy receiving surface formed by the top flanges of said group of channels, and means for providing an indication of the temperatures existing at selected points along the web of the central channel of said group.

7. A simulator for use in studying the unsteady-state heat transfer conditions within organic materials comprising, in combination, first, second and third hollow metallic cylinders, a circular metallic cap concentrically mounted on one end of said cylinder and covering that end of said cylinder, a first metallic annulus concentrically mounted on one end of said second cylinder, a second metallic annulus concentrically mounted on one end of said third cylinder, the diameter of said metallic cap being greater than the diameter of said first cylinder but less than the inner diameter of said first annulus, the outer diameter of said first annulus being greater than the diameter of said second cylinder but less than the inner diameter of said second annulus and the outer diameter of said second annulus being greater than the diameter of said third cylinder whereby when said cylinders are nested one within the other with the surfaces of said cap and annuli coplanar first and second air gaps separate the cap from the first annulus and the second annulus from the first annulus, said air gaps functioning to inhibit the transfer of heat from said cap when said cap is exposed to a burst of thermal energy and the means for indicating the temperature existing along the outer surface of said first cylinder as a consequence of the above exposure.

References Cited in the file of this patent

UNITED STATES PATENTS

| 1,659,804 | Brown | Feb. 21, 1928 |
| 2,769,334 | Soehngen | Nov. 6, 1956 |

FOREIGN PATENTS

| 700,166 | Great Britain | Nov. 25, 1953 |

OTHER REFERENCES

Article: "Studies of Thermal Injury," by Henrigues, published in Rev. of Scientific Instruments, vol. 18, No. 9, September 1947, pages 673–680.